(No Model.)
J. HEMPFLING.
HORSESHOE.
No. 552,958. Patented Jan. 14, 1896.
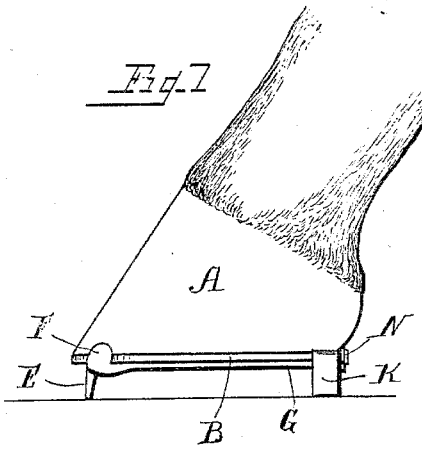
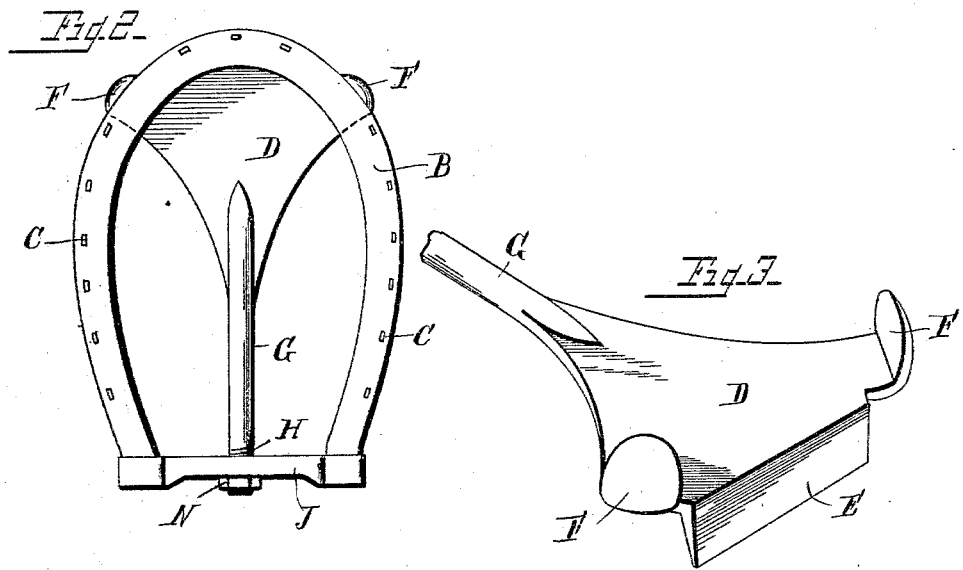
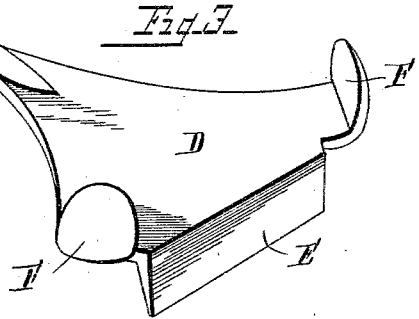
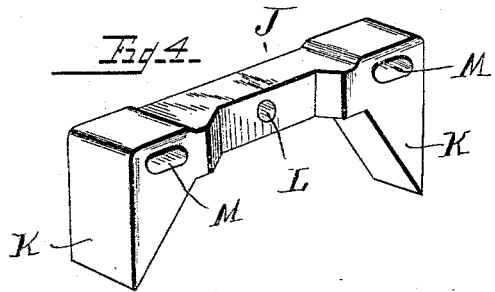
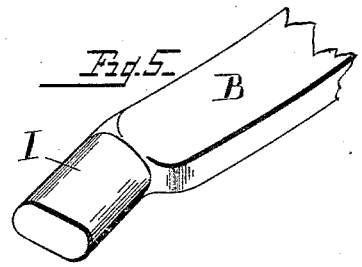
Witnesses
Carroll J. Webster
A. E. Glanock
Inventor
John Hempfling
by James G. Young,
his Attorney

UNITED STATES PATENT OFFICE.

JOHN HEMPFLING, OF KANSAS CITY, KANSAS.

HORSESHOE.

SPECIFICATION forming part of Letters Patent No. 552,958, dated January 14, 1896.

Application filed November 7, 1893. Serial No. 490,329. (No model.)

*To all whom it may concern:*

Be it known that I, JOHN HEMPFLING, a citizen of the United States, residing at Kansas City, in the county of Wyandotte and State of Kansas, have invented a new and useful Improvement in Horseshoes, of which the following is a full, clear, and exact description.

This invention relates to a new and useful improvement in horseshoes; and it consists in the construction and arrangement of parts hereinafter described, and definitely pointed out in the claim.

The aim and purpose of this invention is to construct a horseshoe having a shoe-body which is adapted to be permanently attached to the hoof, and a plate having suitable calks adapted to be secured to the body of the shoe and the hoof in such a manner that it can be readily detached and another plate with different styles of calks attached; and also in providing means whereby the plate is clinched onto the hoof, relieving any strain on the body portion; and also in providing a heel-bar which carries the rear calks and which is adapted to be secured to the stem of the plate and at the same time not project beyond the rear of the hoof and interfere with the movement of the animal. These objects are obtained by the construction illustrated in the accompanying drawings, wherein like letters of reference indicate corresponding parts in the several views, and in which—

Figure 1 is a side elevation of a hoof, showing my improved shoe applied thereto. Fig. 2 is a top plan view of the shoe-body with the plate and heel-bar in position. Fig. 3 is a detail perspective view of the plate. Fig. 4 is a perspective view of the heel-bar, and Fig. 5 is a detail perspective view of one of the rear ends of the shoe-body.

In the drawings, A represents a hoof, and B the shoe-body, which is of the usual shape to conform with the contour of a hoof and adapted to be permanently attached thereto by suitable nails passing through apertures C in the body.

D represents the plate, which is provided with the toe-calk E, which is preferably formed integral with the plate.

F represents clips which extend up on opposite sides of the forward end of the plate and are adapted to bear against the hoof, as hereinafter described.

G represents a stem of the plate extending rearwardly therefrom and provided with a threaded end H.

The rear ends of the shoe-body are reduced, as shown at I, Fig. 5, for a purpose hereinafter described.

J represents the heel-bar which is provided with the heel-calks K. The bar and calks are preferably formed of an integral piece of suitable metal. This plate J is provided with the central aperture L through which the stem of the plate is adapted to be passed, and the apertures M on opposite ends of the bar. These apertures M correspond to the reduced ends I of the shoe-body.

N is a securing-nut adapted to be screwed onto the projecting end of the stem after the heel-bar has been placed in position.

In the construction, as above described, it is to be noticed that when the plate is in position the stem extends only to the rear ends of the shoe-body, and this body being of a size to fit the hoof without the rear ends protruding beyond the same, as shown in Figs. 1 and 2, and by forming these rear ends with the reduced portions a space is left between the hoof and these reduced ends which is sufficient to allow the heel-bar to be passed onto the rear ends of the shoe-body between the rear reduced ends and the hoof. This I regard as an important feature of my invention, for the reason that by this construction I am enabled to detachably secure the heel-bar carrying the heel-calks to the shoe-body and stem of the plate and at the same time assemble the parts so that no portion will extend beyond the rear of the hoof to interfere with the movement of the animal. While I have shown the rear reduced ends I as rounded and the corresponding apertures M also rounded, it is evident that these reduced ends and apertures could be of other shapes, it only being necessary to leave enough space between the hoof and reduced ends to allow the heel-bar to be passed between the same.

It will also be noticed that the clips F on the plate bear directly against the hoof and when the securing-nut N is screwed tight the strain of the forward portion of the plate is carried entirely by the hoof, so that I am enabled to make the shoe-body of light material, and also by this arrangement the shoe-body is not liable to be detached from the hoof owing to the concussion on the plate when the animal is moving.

Having thus described my invention, what I claim as new, and desire to secure by Letters Patent, is—

A horseshoe, consisting of a shoe body conforming to the shape of a hoof and having its ends extending to the rear of the hoof only, and adapted to be secured to the hoof and provided with reduced ends leaving a space between the hoof and said reduced ends, a plate below the shoe body, clips on the plate extending upwardly and adapted to bear against the hoof, a rearwardly extending stem on the plate, a heel bar having an aperture through which the stem passes and apertures conforming to the reduced ends of the shoe body, and adapted to be placed on the ends of the said shoe body between the hoof and said reduced ends, and means for detachably securing the bar to the ends of the shoe body and stem, substantially as described.

JOHN HEMPFLING.

Witnesses:
NIKOLAUS ROTHERMEL,
GEO. I. STORY.